United States Patent
Massie

(10) Patent No.: US 8,609,051 B2
(45) Date of Patent: Dec. 17, 2013

(54) CATALYST COMPOSITION USEFUL IN THE CATALYTIC REDUCTION OF SULFUR COMPOUND CONTAINED IN A GAS STREAM AND A METHOD OF MAKING AND USING SUCH COMPOSITION

(75) Inventor: Stephen Neil Massie, Spring, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/398,535

(22) Filed: Feb. 16, 2012

(65) Prior Publication Data

US 2012/0148468 A1 Jun. 14, 2012

Related U.S. Application Data

(66) Division of application No. 12/208,407, filed on Sep. 11, 2008, now Pat. No. 8,142,748, Substitute for application No. 60/973,014, filed on Sep. 17, 2007.

(51) Int. Cl.
  *B01D 53/56* (2006.01)
  *B01J 23/00* (2006.01)
(52) U.S. Cl.
  USPC ............................. 423/244.1; 502/313
(58) Field of Classification Search
  None
  See application file for complete search history.

(56) References Cited

U.S. PATENT DOCUMENTS

| | | | |
|---|---|---|---|
| 3,151,940 A * | 10/1964 | Kehl et al. | 423/265 |
| 3,549,556 A | 12/1970 | Dienes | 252/455 |
| 3,554,689 A | 1/1971 | Bloembergen et al. | 23/2 |
| 4,102,822 A * | 7/1978 | Mulaskey | 502/322 |
| 4,654,319 A * | 3/1987 | Kim et al. | 502/304 |
| 4,668,491 A | 5/1987 | Wimmer et al. | 423/244 |
| 4,937,218 A * | 6/1990 | Ramirez de Aqudelo et al. | 502/152 |
| 4,944,905 A * | 7/1990 | Gibb et al. | 264/660 |
| 5,132,098 A | 7/1992 | Kvasnikoff et al. | 423/574 R |
| 5,187,133 A * | 2/1993 | Yoshinari et al. | 502/66 |
| 6,080,379 A | 6/2000 | Nedez et al. | 423/511 |
| 6,358,486 B1 | 3/2002 | Shan et al. | 423/326 |
| 2001/0025119 A1* | 9/2001 | Voit et al. | 558/452 |
| 2005/0211603 A1 | 9/2005 | Guillaume et al. | 208/111.3 |
| 2007/0017850 A1 | 1/2007 | Euzen et al. | 208/58 |
| 2008/0293561 A1* | 11/2008 | Long et al. | 502/65 |

FOREIGN PATENT DOCUMENTS

| | | | |
|---|---|---|---|
| CN | 1836768 | 9/2006 | B01D 53/86 |
| EP | 0692306 | 1/2002 | B01J 23/04 |
| RU | 2116123 | 7/1998 | B01D 53/48 |
| RU | 2142404 | 10/1999 | C01B 17/04 |
| WO | WO2007101883 | 9/2007 | B01J 35/10 |

* cited by examiner

*Primary Examiner* — Bijay Saha
(74) *Attorney, Agent, or Firm* — Charles W. Stewart

(57) ABSTRACT

Disclosed is a composition useful in the hydrolysis of sulfur compounds that are contained in a gas stream. The composition comprises alumina, a group VI metal component and a group VIII metal component. The composition has a pore structure such that a large percentage of its total pore volume is contained within the pores having a pore diameter greater than 10,000 angstroms.

19 Claims, 2 Drawing Sheets

Figure 1:
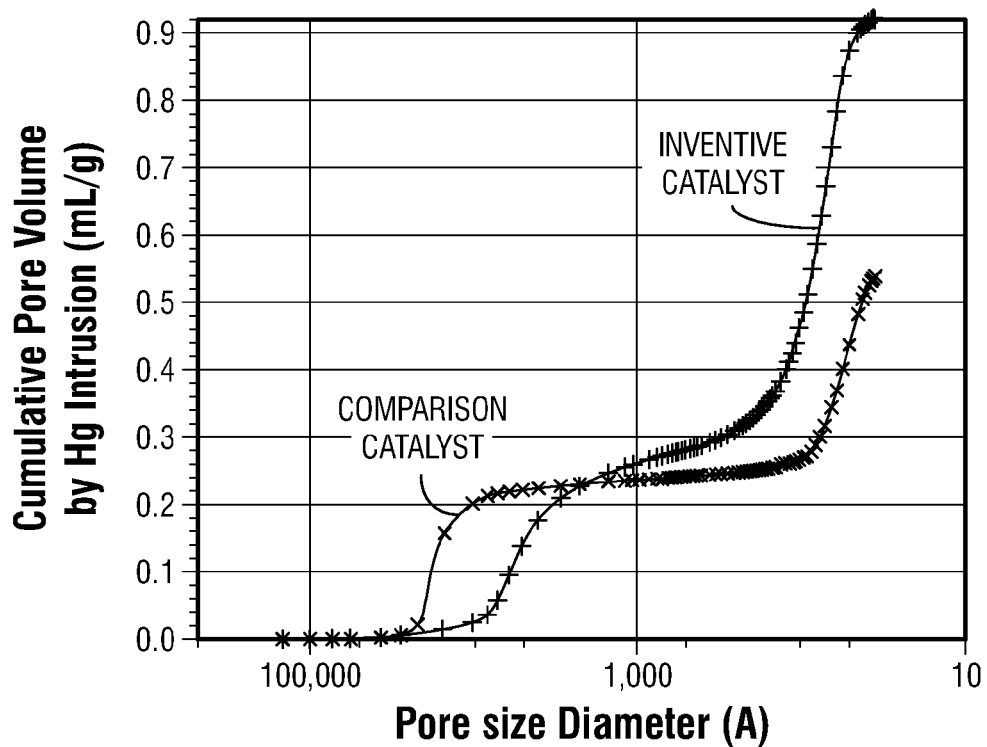

CATALYST COMPOSITION USEFUL IN THE CATALYTIC REDUCTION OF SULFUR COMPOUND CONTAINED IN A GAS STREAM AND A METHOD OF MAKING AND USING SUCH COMPOSITION

This application is a divisional of application Ser. No. 12/208,407 filed Sep. 11, 2008, now U.S. Pat. No. 8,142,748 and claims the benefit of U.S. Provisional Application No. 60/973,014, filed Sep. 17, 2007, which is incorporated herein by reference.

The present invention relates to a catalyst composition useful in the catalytic reduction of sulfur compounds that are contained in a gas stream, a method of making such catalyst composition, and a hydrolysis process for the reductive conversion of sulfur compounds contained in a gas stream.

In the well-known Claus process, an acid gas that contains a significant percentage of hydrogen sulfide ($H_2S$) is combusted in a thermal stage in order to oxidize a portion of the $H_2S$ to sulfur dioxide ($SO_2$). This combustion is controlled so as to thereby provide a process gas stream containing $H_2S$ and $SO_2$ that are present therein in an approximate molar ratio of 2 moles of $H_2S$ per mole of $SO_2$ (2:1). This process gas stream is passed to a catalytic stage whereby the $H_2S$ and $SO_2$ are reacted in the presence of an alumina catalyst in accordance with the Claus reaction to yield elemental sulfur and water. The sulfur is then condensed from the Claus reaction gas, and a Claus tail gas stream is yielded. The Claus tail gas stream typically contains small concentrations of $H_2S$ and other sulfur compounds, such as, $SO_2$, carbon disulfide ($CS_2$), carbonyl sulfide (COS), and elemental sulfur (S). In order for this tail gas stream to be combusted, or otherwise disposed of, it must be further processed in order to remove much of the sulfur therefrom to thereby provide a treated gas having a sufficiently low sulfur content that allows its combustion or release into the atmosphere.

One method by which the tail gas is treated is to pass it to a reduction reactor whereby the sulfur compounds (i.e., $SO_2$, $CS_2$, COS, and S) in the tail gas stream are catalytically reduced to $H_2S$ to thereby provide a treated gas stream having a reduced concentration of the sulfur compounds due to their conversion to $H_2S$. This treated gas stream may then be further processed to remove the $H_2S$ therefrom, for example, by passing the treated gas stream to an absorption unit whereby it is contacted with an absorbent for removing the $H_2S$ from the treated gas stream.

One early process taught by U.S. Pat. No. 3,554,689 provides for the removal of carbon oxysulfide, i.e., COS, from a gas stream by catalytic hydrolysis into $H_2S$. Disclosed in this patent is a process by which COS is removed from combustion gases that also contain oxygen by first contacting the gases with an active hydrogenation catalyst for converting the oxygen and, thereafter, contacting the resulting substantially oxygen-free gases with a COS conversion catalyst for converting the COS to $H_2S$. The $H_2S$ can then be removed by absorption. The conversion of COS may be effected at temperatures below 150° C. The COS conversion catalyst includes alumina having a specific surface area of more than 50 $m^2$/g and can contain one or more Group VI and/or Group VIII metal oxides. Further embodiments of the COS conversion catalyst include the presence therein of an amount of alkali metal phosphate. There is nothing in the '689 patent disclosure indicating that the COS conversion catalyst has utility in the reduction of other sulfur compounds such as $CS_2$, $SO_2$ and elemental sulfur. Moreover, one requirement of the process of the '689 patent is for the combustion gases to first undergo a catalytic oxygen removal step so that the gas that is treated to remove the COS by catalytic hydrolysis is substantially oxygen free.

U.S. Pat. No. 4,668,491 discloses a process and catalyst for the selective catalytic hydrolysis of the sulfur compounds COS and/or $CS_2$ that are present in a carbon monoxide containing process gas. The hydrolysis catalyst disclosed by the '491 patent includes chromium oxide and an alkali metal compound supported on an aluminum oxide carrier with gamma alumina being the preferred form of aluminum oxide. The carbon monoxide content of the process gas is significant and is passed over the hydrolysis catalyst at temperatures in the range of from 100° C. to 350° C.

U.S. Pat. No. 5,132,098 discloses a process in which the sulfur compounds of $SO_2$, $CS_2$, COS and elemental sulfur contained in a Claus unit tail gas (residual gas) are catalytically converted by either hydrogenation or hydrolysis to $H_2S$. This hydrogenation or hydrolysis treatment is carried out at a temperature in the range of from 140° C. to 550° C. using a catalyst that contains a compound of a metal selected from the metals of groups Va, VIa and VIII of the periodic table which is deposited on a silica or silica/alumina support. A more specific catalyst disclosed in the '098 patent includes cobalt oxide and molybdenum oxide deposited on alumina. While the '098 patent discloses a catalyst including alumina impregnated with 1.75 wt % cobalt and 8 wt % molybdenum, there are no teachings concerning the ranges of these components or concerning the form of the alumina of the catalyst. There further is no recognition of the importance of the pore structure characteristics of the catalyst in providing for low-temperature hydrogenation and hydrolysis reactions or in providing for high conversion of sulfur compounds to hydrogen sulfide.

U.S. Pat. No. 5,132,098 discloses a catalyst for use in converting sulfur compounds, such as COS and $CS_2$, contained in gas streams to hydrogen sulfide. The catalyst includes an inorganic oxide support that is impregnated with a mixture of metal oxides that includes oxides of at least three metals. The preferred catalysts are those in which the inorganic oxide support is aluminum oxide, preferably, γ-alumina, and oxides of Cu, Zn, Cr, Mo, W, Fe, Co, and Ni, where each of the metal oxides is present in a quantity of from about 0.05 to about 4 wt %. It is notable that the catalyst is required to contain three or more metal oxides.

U.S. Pat. No. 6,080,379 discloses an alumina catalyst used for the treatment of sulfur-containing gases either by carrying out the Claus reaction or by hydrolysis. The catalyst has an optimized macroporosity wherein its porosity is such that the volume in the pores of diameter greater than 0.1 μm (1,000 Å) is greater than 12 ml/100 g of catalyst and that the ratio of the volume in the pores of diameter greater than 1 μm (10,000 Å) to the volume in the pores of diameter greater than 0.1 μm (1,000 Å) is greater than or equal to 0.65. The alumina may possibly be a transition alumina selected from the group consisting of rho (ρ), chi (χ), eta (η), gamma (γ), kappa (κ), theta (θ), delta (δ), and alpha (α). The catalyst may additionally contain a metal oxide. The use of the catalyst in the hydrolysis of $CS_2$ appears to require a significantly high reactor temperature but still without providing for a high $CS_2$ conversion.

It is desirable to provide a process for the catalytic reduction of sulfur compounds (i.e. by the hydrolysis of COS and $CS_2$ and the hydrogenation of $SO_2$ and S to $H_2S$) that are contained in a gas stream, and, in particular, to provide for the catalytic reduction of sulfur compounds that are contained in a Claus unit tail gas stream.

It is also desirable to have a catalyst composition that can provide for the low-temperature reduction of sulfur compounds contained in a gas stream, and, further, provide for a high percentage conversion of such sulfur compounds to hydrogen sulfide.

Thus, accordingly, provided is a catalyst composition useful in the catalytic reduction of sulfur compounds contained in a gas stream, wherein said catalyst composition comprises: alumina, a group VI metal component and a group VIII metal component, wherein said catalyst composition has a pore structure such that a large percentage of the total pore volume of said catalyst composition is contained within the pores of said catalyst composition having a pore diameter greater than 10,000 Å. This catalyst composition can be made by incorporating a group VI metal component and a group VIII metal component into an alumina particle comprising alumina having more than 10% of its total pore volume that is contained within the pores having a pore diameter greater than 10,000 Å to thereby provide an intermediate; and calcining said intermediate to thereby provide said catalyst composition.

Also provided is a hydrolysis process, comprising: introducing a gas stream into a reactor that is operated at suitable reduction reaction conditions, wherein said gas stream comprises a sulfur compound, and contacting said gas stream with a catalyst composition, wherein said catalyst composition comprises alumina, a group VI metal component and a group VIII metal component, and wherein said catalyst composition has a pore structure such that a large percentage of the total pore volume of said catalyst composition is contained within the pores of said catalyst composition having a pore diameter greater than 10,000 Å; and yielding from said reactor a treated gas stream having a reduced concentration of said sulfur compound.

FIG. 1 presents plots of the measured cumulative pore volume versus pore size diameter of the inventive catalyst composition and of a comparison catalyst.

Figure 2:
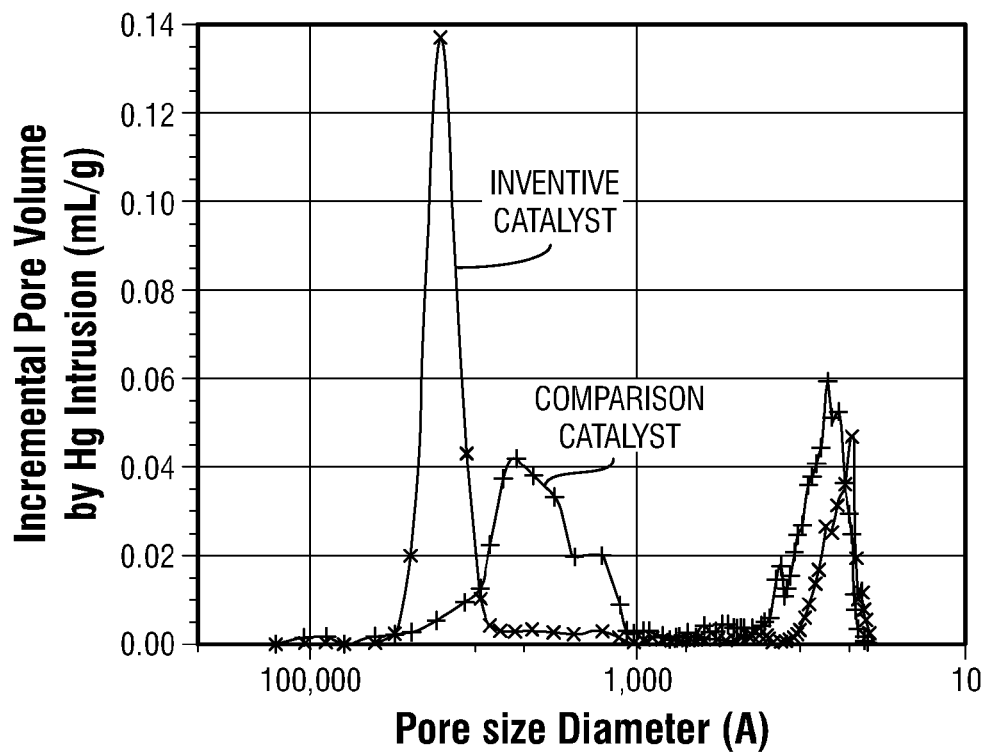

FIG. 2 presents plots of the measured incremental pore volume versus pore size diameter of the inventive catalyst composition and of a comparison catalyst.

Figure 3:
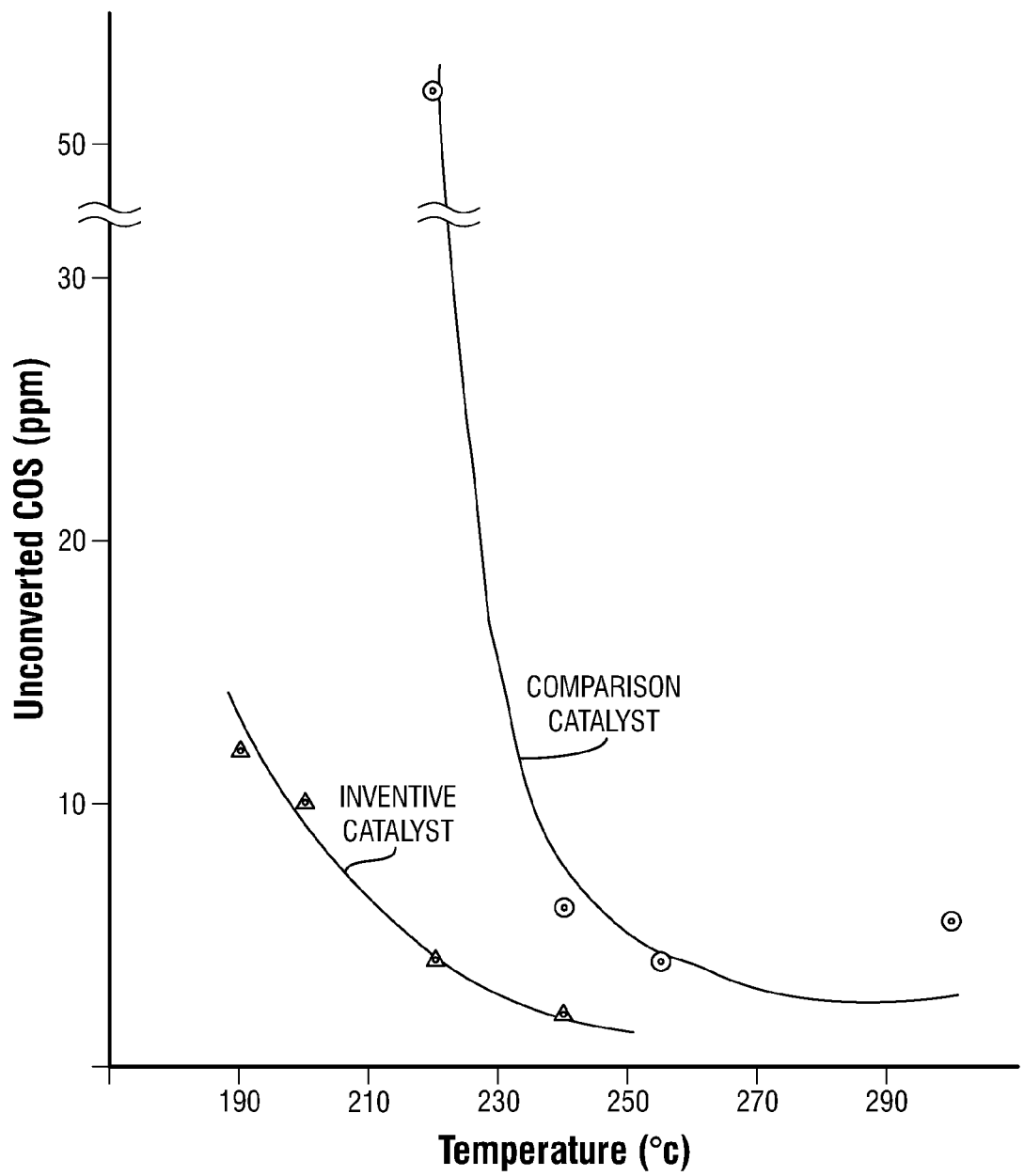

FIG. 3 presents plots of the concentration level of the carbonyl sulfide (COS) sulfur compound that is in a treated gas stream from a hydrolysis reactor operated using either the inventive catalyst or a comparison catalyst to treat a gas stream containing COS.

The catalyst of the invention has properties that make it particularly useful in the low-temperature catalytic hydrolysis of sulfur compounds that are contained in a gas stream. As it is to be used herein, the term "hydrolysis" may refer both to the hydrolysis reaction of either $CS_2$ or COS with water ($H_2O$) to yield $H_2S$ and $CO_2$ or to the hydrogenation reaction of either $SO_2$ or $S_x$ with hydrogen ($H_2$) to yield $H_2S$ and, in the case of the $SO_2$ reaction, water. The catalyst of the invention further provides for an exceptionally high conversion of sulfur compounds that are contained in a gas stream to be treated even when the catalyst is used under relatively lower reaction temperature conditions than those typically required with the use of comparative catalysts. While the reasons for this exceptionally high performance of the inventive catalyst are not known with certainty, it is theorized that it is a combination of the unique pore structure of the inventive catalyst along with the specific types of metals and the high metals loading of the catalyst that provide for such exceptional performance.

The catalyst composition of the invention, thus, in addition to the metals loading thereof, has a unique pore structure wherein a large percentage of the total pore volume of the catalyst composition is contained within its pores having exceedingly large pore diameters of greater than 10,000 angstroms (Å). This large percentage of the total pore volume of the catalyst composition contained within the pores of pore diameter greater than 10,000 Å, in general, should exceed 10 percent of the total pore volume. It is believed that the large percentage of total pore volume that is contained in the extra large pores contributes to the ability of the catalyst composition to provide for the high conversion and low-temperature hydrolysis of sulfur compounds of a gas stream even when the catalyst composition is used under reaction conditions involving the application of high gaseous space velocities. And, thus, it is preferred for the percent of the total pore volume of the catalyst composition that is contained in its pores of pore diameter greater than 10,000 Å to exceed 15 percent of the total pore volume of the catalyst composition. It is even more preferred for this percentage to exceed 25 percent, and, most preferred, the percentage exceeds 35 percent.

Another unique property of the pore structure of the inventive catalyst composition thought to possibly contribute to its exceptional performance in catalytic hydrolysis applications is the bimodal distribution of the size of its pores. The catalyst composition has the property wherein its pore distribution is such that its pore volume is predominantly contained within pores having exceedingly large pore diameters and pores having small pore diameters but with very little of the pore volume of the catalyst composition being contained within the pores having mid-sized diameters. Thus, a significant proportion of the total pore volume of the catalyst composition should be contained within its pores having a small pore diameter, i.e., a pore diameter of less than 70 Å. This significant proportion of the total pore volume of the catalyst composition contained within the pores of pore diameter less than 70 Å, in general, should exceed 10 percent of the total pore volume. It is preferred for the percent of the total pore volume of the catalyst composition that is contained in the pores of pore diameter less than 70 Å to exceed 15 percent of the total pore volume. It is more preferred for this percentage to exceed 25 percent, and, most preferred, the percentage exceeds 35 percent.

Because one of the essential characteristics of the catalyst pore structure is for it to have a high macroporosity, as defined below, the proportion of the total pore volume of the catalyst composition contained in the pores of pore diameter less than 70 Å should be less than 70 percent of the total pore volume. It is preferred for the percent of the total pore volume of the catalyst composition that is contained in the pores of pore diameter less than 70 Å to be less than 65 percent of the total pore volume, and, more preferred, is for this percentage to be less than 60 percent. Thus, for example, the proportion of the total pore volume of the catalyst composition contained in the pores of pore diameter less than 70 Å can be in the range of from 10 to 70%, and a particularly preferred range is, for example, from 35 to 60%.

The catalyst composition of invention may further be characterized by its macroporosity. The term "macroporosity" is used herein to refer to a measure of the porosity of the catalyst composition as represented by the percentage of the total pore volume of the catalyst that is contained in its macropores. The macropores are the pores of the catalyst composition having a pore diameter greater than 350 Å. While the pore structure characteristic of having a high percentage of the total pore volume of the catalyst that is contained within its pores exceeding 10,000 Å is recognized as being a particularly important feature of the catalyst composition, this property is encompassed by macroporosity property which should be greater than 30%, preferably, greater than 35%, and, more preferably, greater than 40%. As noted above, very little of the total pore volume of the catalyst is contained within the mesopores of the catalyst. The mesopores are those pores of the catalyst that have a pore diameter between 70 Å and 350 Å.

As alluded to above, it is theorized that, in some way, the combination of the presence within the inventive catalyst composition of a large proportion of its total pore volume that is contained in the extra-large pores of greater than 10,000 Å and a large proportion of its total pore volume that is contained in the smaller pores of less than 70 Å contributes to the uniquely special catalytic properties of the inventive catalyst when it is used in catalytic hydrolysis applications. One of the physical properties of the inventive catalyst composition that reflects some of these desirable features is for its ratio of its pore volume that is contained in the pores of greater than 10,000 Å to its pore volume that is contained in the pores of less than 70 Å (also referred to herein as the large/small pore ratio) to exceed 0.6. It is further desirable for this large/small pore ratio to exceed 0.75, but it is more desirable for the large/small pore ratio to exceed 0.8. It is most desirable for the large/small pore ratio to exceed 1, and it is especially desirable for the large/small pore ratio to exceed 1.2.

The catalyst composition of the invention has a relatively high metals loading while still having the characteristic of a high macroporosity. It is believed that this combination of characteristics provides a catalyst that is particularly useful in the hydrolysis of sulfur compounds under low-temperature reaction conditions and at high reactor space velocities. Thus, the catalyst composition can contain a metal component of either a group VI metal compound or a group VIII metal compound, or metal components of both a group VI metal compound and a group VIII metal compound.

The group VI metal component of the catalyst composition is selected from those group VI metals or metal compounds that, in combination with the other components of the catalyst composition, suitably provide the catalyst composition for use in the hydrolysis of sulfur compounds. The group VI metal can be selected from the group of metals consisting of chromium, molybdenum and tungsten. The preferred group VI metal is either molybdenum or chromium, and, most preferred, it is molybdenum.

The group VI metal component contained in the catalyst composition can be in the elemental form or in the form of a metal compound, such as, for example, an oxide, a sulfide, and the like. The amount of group VI metal in the catalyst composition can be in the range upwardly to 20 wt. % elemental metal based on the total weight of the catalyst composition. Preferably, the concentration of group VI metal in the catalyst composition is in the range of from 3 wt. % to 15 wt. %, and, most preferably, from 6 wt. % to 12 wt. %

The group VIII metal component of the catalyst composition is selected from those group VIII metals or metal compounds that, in combination with the other components of the catalyst composition, suitably provide the catalyst composition for use in the hydrolysis of sulfur compounds. The group VIII metal can be selected from the group of metals consisting of nickel and cobalt, with cobalt being preferred. The group VIII metal component contained in the catalyst composition can be in the elemental form or in the form of a metal compound, such as, for example, an oxide, a sulfide and the like. The amount of group VIII metal in the catalyst composition can be in the range upwardly to 10 wt. % elemental metal based on the total weight of the catalyst composition. Preferably, the concentration of group VIII metal in the catalyst composition is in the range of from 0.5 wt. % to 6 wt. %, preferably, from 1 wt. % to 5 wt. %, and, most preferably, from 2 wt. % to 4 wt. %.

It is desirable for the catalyst composition to have a significantly large surface area in addition to having a high macroporosity and high metals loading. Thus, the surface area of the catalyst composition, as measured by the B.E.T. method, is generally in the range of from 200 $m^2/g$ to 400 $m^2/g$. More typically, the surface area is in the range of from 220 $m^2/g$ to 375 $m^2/g$, and, most typically, the surface area is from 220 $m^2/g$ to 300 $m^2/g$ The total pore volume of the catalyst composition, as measured by using standard mercury porosimetry methods, is in the range of from 0.4 cc/g to 1.2 cc/g. More typically, the total pore volume of the catalyst composition is in the range of from 0.45 cc/g to 1.1 cc/g, and, most typically, from 0.5 to 1 cc/g.

The properties of the alumina component of the catalyst composition are important in that they must be such that a particle may be prepared or formed from the alumina and into which particle the metal component may be impregnated, or incorporated, therein to ultimately provide a catalyst composition having the pore structure and other properties as described herein.

The alumina particles may be prepared by any suitable method known to those skilled in the art for agglomerating or forming a powder into a particle containing alumina. In one suitable method of preparing the alumina particle into which the metal component is to be incorporated, an alumina powder or a powder of an alumina precursor, for instance, a hydrated alumina such as hydrargillite, bayerite, boehmite, and pseudoboehmite, is placed onto a rotating disk-pan agglomerator and water is sprayed onto the powder. As the disk-pan is rotated, the powder forms into balls or beads. The disk-pan angle of inclination, rotation speed, and materials (e.g. alumina and water) addition rate are all controlled to produce spherically shaped alumina balls of desired size that are then aged and activated by high temperature calcination. The final balls may be screened to separate the balls of desired size range.

When alumina balls or beads are used in the preparation of the catalyst composition of the invention, they may have a nominal diameter in the range of from 1.5 mm to 15 mm, preferably, from 2 mm to 12 mm, and, most preferably, from 2.5 mm to 10 mm.

The alumina of the catalyst composition of the invention may be present therein in any of the several phases of alumina, such as, rho ($\rho$), chi ($\chi$), eta ($\eta$), gamma ($\gamma$), kappa ($\kappa$), theta ($\theta$), delta ($\delta$), and alpha ($\alpha$), provided that the catalyst composition has the pore structure and other properties as described herein. However, it is believed that the particular phase of the alumina component of the inventive catalyst composition may contribute to the beneficial properties that it has toward the catalytic hydrolysis of sulfur compounds and that the particular form of alumina of importance is the eta phase of alumina. Therefore, it is desirable for the alumina component of the catalyst composition to be substantially in the form of eta-alumina, and, in a preferred embodiment of the inventive catalyst composition, at least 50 percent of the alumina is to be in the form of eta-alumina, and, more preferred, at least 75 percent of the alumina is in the form of eta-alumina. In a most preferred embodiment, at least 90 percent of the alumina of the catalyst composition is eta-alumina.

In the preparation of the catalyst composition of the invention, the metal component is incorporated into the alumina particle by any suitable means or method known to those skilled in the art for incorporating a metal compound into a formed or shaped alumina particle. In one preferred method, the metal component is incorporated into the alumina particle by a standard incipient wetness impregnation method.

The metal components may be impregnated into the alumina particle using one or more impregnation solutions containing one or more of the metal components or precursors thereof. The preferred impregnation solution is an aqueous solution of metal salts of the desired metal compounds. In the case of group VIII metal (Ni and Co), group VIII metal acetates, carbonates, nitrates, hydroxides, sulfates, and mixtures thereof may be used, with the preferred compound being a metal hydroxide or metal nitrate. In the case of group VI metal (Cr, Mo and W), any metal salt that may be a precursor of the metal oxide or metal sulfide, may be used in the impregnation solution. Preferred salts of the group VI metal are those including an ammonium ion, such as ammonium heptamolybdate and ammonium dimolybdate. The concentration of the metal compounds in the impregnation solution is selected so as to provide the desired metal concentration in the final catalyst composition of the invention. Typically, the concentration of the metal compound in the impregnation solution is in the range of from 0.01 to 100 moles per liter. The amounts of metal compound incorporated into the alumina particle is such that when alumina particle having incorporated therein the metal component is dried and calcined the final catalyst composition has the desired concentrations of the metal components as defined herein.

The impregnated alumina particle can be dried prior to its calcination, generally, in air and at a drying temperature in the range of from about 75° C. to 250° C. The time period for drying is any suitable time period that can provide the desired amount of drying prior to the calcination and can be in the range of from 0.1 hour to 72 hours. After drying, the impregnated alumina particle can then be calcined in the presence of an oxygen-containing fluid, such as air, at a temperature and for a time period that are suitable for achieving the desired degree of calcination to provide the final catalyst composition of the invention. Generally, the calcination temperature is in the range of from 300° C. to 800° C., preferably, from 350° C. to 700° C., and, most preferably, from 400° C. to 600° C. The calcination time period can be in the range of from 0.1 hour to 96 hours.

The inventive catalyst composition is useful in the hydrolysis of sulfur compounds that are contained in a gas stream, and, more particularly, the catalyst composition is especially useful in the treatment of tail gas streams generated by Claus process units in order to convert the sulfur compounds contained in the tail gas stream to $H_2S$, which subsequently may be removed by any of the many suitable means or methods known to those skilled in the art for removing $H_2S$ from a gas stream. The catalyst composition has certain unique catalytic properties when used in the treatment of Claus unit tail gas streams that allows for the operation of a hydrolysis reactor at lower temperature conditions than required for hydrolysis reactors that utilize conventional catalysts, and the catalyst composition provides for a high conversion of the sulfur compounds even at the lower reactor temperature conditions. The catalyst composition further allows for the passing of the gas stream through the hydrolysis reactor at a much higher flow rate, and, thus, a much higher space velocity, than is allowed for hydrolysis reactors that are loaded with conventional catalysts, but, still provide for a high conversion of sulfur compounds at the reduced reactor temperature conditions.

In the operation of a typical conventional hydrolysis reactor system, which includes a reactor loaded with a conventional hydrolysis catalyst, the tail gas is required to be heated up significantly prior to its introduction into the hydrolysis reactor. This is due to the tail gas that is discharged from a Claus unit passing from the sulfur condenser that operates close to the condensation temperature of elemental sulfur. The temperature of a typical Claus unit tail gas stream is in the range of from 110° C. to 125° C. For conventional hydrolysis units, the tail gas typically must be heated up so that the introduction temperature, or reactor inlet temperature, of the tail gas feed to the hydrolysis reactor is in the range of from 250° C. to 350° C. Any reduction of this required tail gas feed inlet temperature to the hydrolysis reactor will provide significant energy savings in its operation. The use of the inventive catalyst composition in the treatment of a Claus tail gas stream can, thus, provide significant energy savings by reducing the temperature required to treat a Claus tail gas stream.

The gas stream that can be treated using the inventive catalyst composition includes one or more gaseous compounds, and, further, it comprises at least one sulfur compound. As the term is used herein, a sulfur compound is a molecular or elemental compound selected from the group of compounds consisting of carbonyl sulfide (COS), carbon disulfide ($CS_2$), sulfur dioxide ($SO_2$), and elemental sulfur ($S_x$). Hydrogen sulfide is omitted from this definition of a sulfur compound; because, the inventive catalyst composition is not intended to provide for the conversion of $H_2S$, but, rather, the sulfur compounds are intended to be reduced by a reduction reaction to hydrogen sulfide. The hydrogen sulfide may afterward be removed from the treated gas stream. The gas stream, thus, includes a compound that is normally gaseous or is in the gas phase at the temperature and pressure conditions of the hydrolysis reactor operation. Examples of gaseous compounds, other than the aforementioned sulfur compounds, include nitrogen, oxygen, carbon dioxide, carbon monoxide, hydrogen, water, and lower hydrocarbons such as methane, ethane and ethylene.

The total concentration of sulfur compounds contained in the gas stream that is charged to or introduced into the hydrolysis reactor containing the inventive catalyst composition can be in the range of from 0.01 volume % (100 ppmv) to 5 volume % of the total gas stream. More typically, the sulfur compound concentration is in the range of from 0.02 vol % (200 ppmv) to 3 vol %.

As earlier noted, the catalyst composition is particularly suited for the treatment of a Claus tail gas stream in order to convert the sulfur compounds contained therein to hydrogen sulfide so as to provide a treated gas stream having a reduced concentration of sulfur compounds below the concentration of sulfur compounds in the tail gas stream to be treated. The following Table 1 presents typical ranges for the more common components that make up a Claus tail gas stream.

TABLE 1

Claus Tail Gas Composition

| Component | Broad Range (vol %) | Intermediate Range (vol %) | Narrow Range (vol %) |
|---|---|---|---|
| $H_2S$ | 0.2-2 | 0.4-1.5 | 0.6-1.2 |
| $SO_2$ | 0.1-1 | 0.2-0.75 | 0.3-0.6 |
| $S_x$ | 0-0.2 | 0.005-0.15 | 0.01-0.1 |
| $CO_2$ | 1-25 | 2-22 | 3-20 |
| $H_2O$ | 20-50 | 25-40 | 30-35 |
| $N_2$ | 40-80 | 45-70 | 50-60 |
| $H_2$ | 0.5-4 | 1-3 | 1.5-2.5 |
| CO | 0.01-2 | 0.1-1 | 0.2-0.8 |
| COS | 0.005-1 | 0.015-0.5 | 0.01-0.1 |
| $CS_2$ | 0.005-1 | 0.015-0.5 | 0.01-0.1 |

TABLE 1-continued

Claus Tail Gas Composition

| Component | Broad Range (vol %) | Intermediate Range (vol %) | Narrow Range (vol %) |
|---|---|---|---|
| Total Sulfur Comp. | 0.11-3.2 | 0.23-1.9 | 0.33-0.9 |

In the hydrolysis process of the invention, a gas stream, having a concentration of a sulfur compound, is introduced into a hydrolysis reactor that contains the catalyst composition and that is operated at suitable hydrolysis or reduction reaction conditions. Within the hydrolysis reactor, the gas stream is contacted with the catalyst composition that is contained therein. A treated gas stream, having a reduced concentration of the sulfur compound, is yielded from the hydrolysis reactor. While the treated gas stream will have an increase in the concentration of $H_2S$ over that of the gas stream, the treated gas stream will have a reduced concentration of sulfur compounds over that of the gas stream. The reduced concentration of sulfur compounds should, generally, be less than 100 ppmv, preferably, less than 50 ppmv, and, most preferably, less than 30 ppmv.

As previously noted, one advantage from the use of the inventive catalyst composition in the hydrolysis of a Claus tail gas stream is that it allows for the operation of the hydrolysis reactor at a relatively low inlet temperature, for example, of less than 250° C. There is a minimum temperature at which the gas stream should be introduced into the hydrolysis reactor, and, thus, the inlet temperature at which the gas stream is charged to or introduced into the hydrolysis reactor is generally in the range of from 140° C. to 250° C. It is preferred for the introduction temperature to be in the range of from 150° C. to 240° C., and, more preferred, the introduction temperature is in the range of from 160° C. to 230° C. It is most preferred for the introduction temperature of the gas stream into the hydrolysis reactor to be in the range of from 170° C. to 220° C.

The operating pressure of the hydrolysis reactor is generally in the range of from 1 bar (14.5 psi) to 100 bar (1450.3 psi), preferably, from 2 bar (29.0 psi) to 70 bar (1015.3 psi), and, more preferably, from 3 bar (43.5 psi) to 50 bar (725.2 psi).

The flow rate at which the gas stream and, if any, the added reducing gas, are introduced into the hydrolysis reactor is generally such as to provide a gaseous hourly space velocity (GHSV) that is in the range of from 10 $hr^{-1}$ to 10,000 $hr^{-1}$. The term "gaseous hourly space velocity" refers to the numerical ratio of the rate at which the hydrocarbon feedstock is charged to the hydrolysis reactor in volume per hour divided by the volume of catalyst contained in the hydrolysis reactor to which the gas stream is charged. The preferred GHSV is in the range of from 10 $hr^{-1}$ to 8,000 $hr^{-1}$, more preferably, from 500 $hr^{-1}$ to 5,000 $hr^{-1}$, and, most preferably, from 1000 $hr^{-1}$ to 4,000 $hr^{-1}$.

In the processing of a Claus tail gas stream, in most instances, it will contain concentrations of water and hydrogen, which can be the source of the reducing gas required for the hydrolysis reaction of the hydrolysis process. But, in the event that the gas stream does not contain a sufficient concentration of reducing gas components, reducing gas may be added as needed to the gas stream. It is generally desirable to have amounts of the reducing gases in the gas stream that are stoichiometrically required to allow for the hydrolysis reactions to proceed to close to completion.

The following examples are presented to further illustrate certain aspects of the invention, but they are not to be construed as unduly limiting the scope of the invention.

EXAMPLE I

This Example I illustrates the preparation of the inventive catalyst composition and of the comparison catalyst, and it presents data concerning certain of the pore structure properties of the two catalysts.

Inventive Catalyst Composition

An impregnation solution was prepared by mixing aqueous ammonia, ammonium di-molybdate and cobalt hydroxide in amounts such as to target in the finished catalyst 9 wt. % molybdenum (on an elemental basis) and 3 wt. % cobalt (on an elemental basis). This mixture was heated to 45° C. and an amount of monoethanolamine (MEA) of from 1.2 to 1.5 moles MEA per mole cobalt was added to the mixture. The mixture was stirred while maintaining the temperature until the metal salts were digested. The solution was then cooled to approximately 30° C. and topped-off with water so as to provide a total volume of solution that approximated the pore volume of the alumina spheres which were to be impregnated with the solution. Alumina spheres or beads having a nominal diameter of 4 mm were impregnated with the solution and aged for two hours with occasional mixing to prevent agglomeration. The impregnated alumina spheres were dried in a convection oven at a temperature of 125° C. for one hour. The dried spheres were calcined in a muffle furnace at a temperature of 538° C. for one hour.

Comparison Catalyst

The comparison catalyst is a commercially available tail gas treatment catalyst marketed by Criterion Catalysts Company as Criterion 234. This catalyst is in the form of a 3.2 mm trilobe extrudate comprising alumina with cobalt and molybdenum. The cobalt content is about 2.5 wt % and the molybdenum content is about 7.2 wt %.

Presented in FIG. 1 are plots of the cumulative pore volume as a function of pore size diameter, measured using mercury porosimetry, of the inventive catalyst composition and of the comparison catalyst. As may be observed from the plots, a greater proportion of the pore volume of the inventive catalyst composition is contained in the pores of significantly larger size than is found in the comparison catalyst. Also, the plot for the inventive catalyst is relatively level, e.g. very little slope, in the range of pore diameters between the larger pores and smaller pores. A significant amount of pore volume is also contained in the smaller pores. The plot for the inventive catalyst composition indicates a bi-modal pore size distribution of pore sizes. The representative plot of the comparison catalyst is, on the otherhand, not level in the middle range of pore diameters suggesting a more even distribution of pore sizes than that of the inventive catalyst composition.

Presented in FIG. 2 are plots of the incremental pore volume as a function of pore size diameter, measured using mercury porosimetry, of the inventive catalyst composition and of the comparison catalyst. As may be observed from these plots, a greater proportion of the incremental pore volume of the inventive catalyst composition is contained in the pores of significantly larger size than is found in the comparison catalyst. This is demonstrated by the peak that is representative of the larger pores of the inventive catalyst composition being shifted outwardly and away from the similar peak for the comparison catalyst. Also, the plot for the inventive catalyst composition shows a peak that is representative of smaller pores that is shifted outwardly and away from the similar peak for the comparison catalyst, thus, demonstrating not only a bi-modal distribution of pore sizes but that a significant proportion of the pore volume of the inventive catalyst composition is contained in the pores of very small size.

EXAMPLE II

This Example II illustrates the use of the catalysts described in Example I in the hydrolysis of a gas stream containing a concentration of at least one sulfur compound and presents performance data for the two catalysts.

The two catalysts of Example I were performance tested using a tail gas pilot unit reactor equipped with a tube furnace used to control the reactor temperature. In preparation for the activity testing, each respective catalyst was sulfided by introducing into the reactor for an overnight period a feed comprising $H_2S$ and $H_2$. A synthetic tail gas that included $H_2S$, $SO_2$, COS, $CS_2$, S, $H_2$, CO, $N_2$, and steam was then charged to the tail gas reactor, operated at various reactor temperatures, at a rate so as to provide a 2000 GHSV. The composition of the reactor effluent for each of the reactor temperature conditions was analyzed using gas/liquid chromatography. The results from the testing are presented in the following Table 2, which results are illustrated in the plots of FIG. 3.

TABLE 2

Unconverted COS in the Reactor Effluent

| Reactor Isothermal Temp (° C.) | Uncoverted COS in ppmv for Inventive Catalyst | Uncoverted COS in ppmv for Comparison Catalyst |
|---|---|---|
| 300 | | 5.5 |
| 255 | | 4 |
| 240 | 2 | 6 |
| 220 | 4 | 52 |
| 200 | 10 | |
| 190 | 12 | |

Presented in FIG. 3 are two plots of the amount of carbonyl sulfide (COS) contained in the treated gas as a function of the reactor temperature. As may clearly be seen from the plots, the inventive catalyst composition provides for the operation of the hydrolysis reactor at significantly lower reactor temperatures to achieve a given conversion of COS than the reactor temperatures required with the use of the comparative catalyst.

That which is claimed is:

1. A method of making a catalyst composition useful in the catalytic reduction of sulfur compounds contained in a gas stream, wherein said method comprises: incorporating into a formed alumina particle a group VI metal component in an amount in the range upwardly to 20 wt. % based on the metal component being in the oxide form and the total weight of the catalyst composition, and a group VIII metal component in an amount in the range upwardly to 10 wt. % based on the metal component being in the oxide form and the total weight of the catalyst composition, wherein said formed alumina particle comprises alumina having more than 10% of its total pore volume that is contained within the pores having a pore diameter greater than 10,000 Å, and having more than 10% and less than 70% of the total pore volume that is contained within pores having a diameter of less than 70 Å, to thereby provide an intermediate; and calcining said intermediate to thereby provide said catalyst composition.

2. A method as recited in claim 1, wherein said alumina has more than 15% of its total pore volume that is contained within the pores having a pore diameter greater than 10,000 Å; wherein more than 50% of said alumina is in the form of η-alumina; and wherein less than 60% of the total pore volume of said catalyst composition is contained within the pores of said catalyst composition having a pore diameter less than 70 Å.

3. A method as recited in claim 1, wherein said alumina particle comprises alumina balls formed from an alumina powder by a disk-pan agglomerator.

4. A method as recited in claim 3, wherein said alumina balls have a nominal diameter between 1.5 mm and 15 mm.

5. A method as recited in claim 3, wherein said alumina balls are formed from a powder of an alumina predecessor, selected from the group consisting of hydragillite, bayerite, boehmite, pseudoboehmite, and a hydrated alumina.

6. A method as recited in claim 1, wherein said alumina particle of said catalyst composition is selected from the group consisting of ρ-alumina, χ-alumina, η-alumina, λ-alumina, κ-alumina, θ-alumina, δ-alumina, and α-alumina.

7. A method as recited in claim 6, wherein at least 50% of said catalyst composition comprises η-alumina.

8. A method as recited in claim 7, wherein at least 75% of said catalyst composition comprises η-alumina.

9. A method as recited in claim 8, wherein at least 90% of said catalyst composition comprises η-alumina.

10. A method as recited in claim 1, wherein either or both of said group VI metal component and said group VIII metal component are incorporated into said alumina particle through an incipient wetness impregnation method.

11. A method as recited in claim 10, wherein said incipient wetness impregnation method uses an impregnation solution comprising a metal compound selected from the group consisting of group VIII metal acetates, group VIII metal carbonates, group VIII metal nitrates, group VIII metal hydroxides, and group VIII metal sulfates.

12. A method as recited in claim 11, wherein said metal compound has a concentration between 0.01 moles per liter and 100 moles per liter.

13. A method as recited in claim 10, wherein said wetness impregnation method uses an impregnation solution comprising a metal compound selected from the group consisting of ammonium heptamolybdate, and ammonium dimolybdate.

14. A method as recited in claim 13, wherein said metal compound has a concentration between 0.01 moles per liter and 100 moles per liter.

15. A method as recited in claim 1, wherein said alumina particle, before said calcining step, is dried at a drying temperature between 75° C. and 250° C.

16. A method as recited in claim 1, wherein said calcining step occurs at a temperature between 300° C. and 800° C.

17. A method as recited in claim 1, wherein said alumina has more than 25% of its total pore volume that is contained within the pores having a pore diameter greater than 10,000 Å°.

18. A method as recited in claim 17, wherein the ratio of the total pore volume that is contained in pores having a pore diameter greater than 10,000 Å to the total pore volume that is contained in pores having a pore diameter less than 70 Å exceeds 0.6.

19. A method as recited in claim 18 wherein said alumina has more than 35% of its total pore volume that is contained within the pores having a pore diameter greater than 10,000 Å.

* * * * *